US006788372B1

(12) United States Patent
Kaise et al.

(10) Patent No.: US 6,788,372 B1
(45) Date of Patent: Sep. 7, 2004

(54) LIQUID, CRYSTAL PANEL, LIQUID CRYSTAL PANEL MANUFACTURING METHOD, LIQUID CRYSTAL DISPLAY, AND LIQUID CRYSTAL PROJECTOR

(75) Inventors: Kikuo Kaise, Kanagawa (JP); Syuichi Shima, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/482,162

(22) Filed: Jan. 12, 2000

(30) Foreign Application Priority Data

Jan. 13, 1999 (JP) .......................................... P11-006082

(51) Int. Cl.$^7$ .......................................... G02F 1/1333
(52) U.S. Cl. ...................................... 349/122; 349/156
(58) Field of Search .................................. 349/122, 156, 349/110, 141, 139, 149, 153, 192, 39, 106, 155; 257/59

(56) References Cited

U.S. PATENT DOCUMENTS

| | | | | |
|---|---|---|---|---|
| 4,568,149 A | * | 2/1986 | Sugata et al. ................ | 349/111 |
| 4,744,639 A | * | 5/1988 | Tsuboyama .................. | 349/162 |
| 4,763,995 A | * | 8/1988 | Katagiri et al. .............. | 349/156 |
| 5,268,782 A | * | 12/1993 | Wenz et al. .................. | 349/156 |
| 5,488,498 A | * | 1/1996 | Fujii et al. .................... | 349/149 |
| 5,510,916 A | * | 4/1996 | Takahashi ..................... | 349/42 |
| 5,666,179 A | * | 9/1997 | Koma ........................... | 349/143 |
| 5,708,485 A | * | 1/1998 | Sato et al. .................... | 349/42 |
| 5,739,890 A | * | 4/1998 | Uda et al. .................... | 349/156 |
| 5,777,713 A | * | 7/1998 | Kimura ........................ | 349/156 |
| 5,831,710 A | * | 11/1998 | Colgan et al. ............... | 349/156 |
| 5,956,112 A | * | 9/1999 | Fujimori et al. ............. | 349/156 |
| 5,982,472 A | * | 11/1999 | Moore .......................... | 349/156 |
| 6,008,876 A | * | 12/1999 | Moore .......................... | 349/139 |
| 6,166,797 A | * | 12/2000 | Bruzzone et al. ........... | 349/155 |
| 6,266,121 B1 | * | 7/2001 | Shigeta et al. .............. | 349/156 |
| 6,300,987 B1 | * | 10/2001 | Jung ............................ | 349/39 |

OTHER PUBLICATIONS

Birendra Bahadur, Liquid Crystals—Applications and Uses, 1990, World Scientific, vol. 1, pp. 173–181.*

* cited by examiner

Primary Examiner—David Y. Chung
(74) Attorney, Agent, or Firm—Rader, Fishman & Grauer PLLC; Ronald P. Kananen

(57) ABSTRACT

A liquid crystal panel of any type is improved in display quality by adjusting a gap size with high accuracy and uniformity, a liquid crystal display and a liquid crystal projector adopting the liquid crystal panel of the present invention. A manufacturing method for such a liquid crystal panel at a low cost with high productivity is also disclosed. The liquid crystal panel is composed generally of first and second substrates opposed to each other with a given gap defined therebetween and a liquid crystal layer filling this given gap. One surface of the first substrate adjacent to the liquid crystal layer is formed with a planarizing film having a flat surface on the liquid crystal layer side. A plurality of pixels in the form of a matrix are formed on the flat surface of the planarizing film, and a light shielding region is formed between any adjacent ones of the pixels by a black matrix and a signal line. A projection for defining the given gap between the first and second substrates is formed on the flat surface of the planarizing film at a position just over the black matrix so as to abut against an innermost surface of the second substrate adjacent to the liquid crystal layer. The projection is formed by a TFT process.

30 Claims, 5 Drawing Sheets

LIQUID, CRYSTAL PANEL, LIQUID CRYSTAL PANEL MANUFACTURING METHOD, LIQUID CRYSTAL DISPLAY, AND LIQUID CRYSTAL PROJECTOR

BACKGROUND OF THE INVENTION

The present invention relates to a liquid crystal panel for use in a liquid crystal display such as a transmissive or reflective liquid crystal display or ferroelectric liquid crystal display, a manufacturing method for the liquid crystal panel, a liquid crystal display using the liquid crystal panel, and a liquid crystal projector using the liquid crystal panel.

A liquid crystal panel used in a related art liquid crystal display has such a structure that a pair of substrates formed of glass or the like are opposed to each other with a given spacing (gap) defined therebetween, and a liquid crystal layer is formed so as to fill the given gap and provide numerous pixels in the form of matrix. One of the pair of substrates has one surface on the liquid crystal layer side formed with a switching element such as a thin-film transistor (TFT) and a pixel electrode for each pixel. The other substrate has one surface on the liquid crystal layer side formed with an opposing electrode opposed to the pixel electrode. In some case, the other substrate is provided with color filters and/or microlenses, for example.

The characteristics of such a liquid crystal panel, such as response speed, contrast, and viewing angle, are closely related with the size of the above gap between the opposed substrates, which size is equal to the thickness of the liquid crystal layer. Therefore, precise control of the gap to a required size is important to obtain a high display quality. Further, if the gap size is nonuniform, there occurs display nonuniformity due to Newton's rings, causing a degradation in viewability. Conventionally, the gap size is adjusted by dispersing rod-like or spherical spacers formed of glass, plastic, etc. between the pair of substrates. The spacers are dispersed by randomly applying them over the surface of any one of the pair of substrates, for example. Further, the display nonuniformity in a related art liquid crystal projector using such a liquid crystal panel is also prevented by a similar method.

However, the gap adjustment using the spacers as mentioned above has the following problems. The above-mentioned gap adjustment is effective in a liquid crystal panel having a large pixel size (e.g., about 200 μm×200 μm pitch) fabricated by using a thin-film transistor (TFT) of amorphous silicon (a-Si) or polysilicon (poly-Si) deposited under low-temperature conditions for a semiconductor layer constituting the switching element. However, in a liquid crystal panel having a small pixel size (e.g., about 20 μm×20 μm pitch or less) fabricated by using a TFT of poly-Si deposited under high-temperature conditions for the semiconductor layer of the switching element, a bright spot or the like is generated, for example, causing a reduction in display quality.

That is, because the spacers are applied over the surface of any one of the pair of substrates and accordingly located also in an effective pixel portion composed of a large number of pixels in the form of a matrix, there occurs an alignment disorder of liquid crystal molecules due to the spacers present in the effective pixel portion in a liquid crystal panel having a small pixel size. Such alignment disorder of liquid crystal molecules has a profound effect on the display quality.

Furthermore, the density of the spacers cannot be adjusted in applying the spacers in the related art technology, so that the gap size tends to be nonuniform in any liquid crystal panel irrespective of the kind of the semiconductor layer, thus readily inviting a reduction in display quality. Accordingly, in a three-panel type liquid crystal projector using such liquid crystal panels, color matching of all the liquid crystal panels used is very difficult because of nonuniformity of the gap size.

In the case of carrying out the gap adjustment by using the spacers, not only the step of applying the spacers to one of the substrates, but also the step of applying a conductive paste for a common electrode portion is necessary. The common electrode portion is provided in a peripheral region of the liquid crystal panel at a position outside of the effective pixel portion, so as to take a common potential between the substrates on the switching element side and the opposing electrode side. Accordingly, these individual process steps and devices to be used in these steps are necessary, so that the manufacturing steps become complicated to cause a reduction in productivity and an increase in manufacturing cost.

In a liquid crystal panel using a ferroelectric liquid crystal in a reflective liquid crystal display utilizing birefringence, the gap adjustment by application of the spacers without occurrence of alignment fault is difficult because the ferroelectric liquid crystal has a layered structure. Further, in the liquid crystal panel using the ferroelectric liquid crystal, very-high-accuracy adjustment of the gap size is required, and this requirement cannot be satisfied even by the use of the spacers.

In the case that the liquid crystal panel has microlenses or the like formed of a material having a coefficient of thermal expansion different from that of the material of the pair of substrates, e.g., glass, there occurs distortion or the like different from each other between the substrates due to heat applied in manufacturing the liquid crystal panel, causing a difficulty of high-accuracy setting of the gap size.

SUMMARY OF THE INVENTION

It is accordingly an object of the present invention to provide a liquid crystal panel of any type such as transmissive or reflective which is improved in display quality by adjusting the gap size with high accuracy and uniformity.

It is another object of the present invention to provide a manufacturing method for the liquid crystal panel at a low cost with high productivity.

It is a further object of the present invention to provide a liquid crystal display using the liquid crystal panel.

It is a still further object of the present invention to provide a liquid crystal projector using the liquid crystal panel.

In accordance with a first aspect of the present invention, there is provided a liquid crystal panel including a first substrate, a second substrate opposed to the first substrate with a given gap defined therebetween, and a liquid crystal layer filling the given gap. The first substrate has one surface formed with a planarizing film having a flat surface on the liquid crystal layer side. A plurality of pixels in the form of a matrix are formed on the flat surface of the planarizing film, and a light shielding region is formed between any adjacent ones of the pixels. A projection for defining the given gap between the first and second substrates is formed on the flat surface of the planarizing film at a position in the light shielding region so as to abut against an innermost surface of the second substrate adjacent to the liquid crystal layer.

In accordance with a second aspect of the present invention, there is provided a manufacturing method for the above liquid crystal panel, having the steps of forming the planarizing film on one surface of a dielectric substrate, forming the projection on the flat surface of the planarizing film at a position in the light shielding region to thereby obtain the first substrate, and bonding the first substrate and the second substrate opposed to each other so that the projection abuts against the innermost surface of the second substrate.

In accordance with another aspect of the present invention, there is provided a liquid crystal display having the above liquid crystal panel. In accordance with a further aspect of the present invention, there is provided a liquid crystal projector (e.g., three-panel type liquid crystal projector) having the above liquid crystal panel.

In the liquid crystal panel according to the present invention, the projection for defining the given gap between the first and second substrates is formed on the flat surface of the planarizing film at a position in the light shielding region so as to abut against the innermost surface of the second substrate. Accordingly, there is no possibility of an alignment disorder of liquid crystal molecules due to the projection in each pixel region. As a result, even when the size of each pixel is small, no reduction in display quality occurs.

The projection may be formed of the same material as that of the planarizing film. Accordingly, the projection and the planarizing film can be formed in the same process step. As a result, the step of applying spacers for gap adjustment as in the related art can be eliminated to thereby reduce the number of manufacturing steps. In the case that another projection similar to the projection is formed as a component of a common electrode portion on the flat surface of the planarizing film at a position outside of an effective pixel portion formed by a large number of the pixels, the other projection can be formed simultaneously with formation of the planarizing film. Alternatively, the other projection may be formed in a step different from the step of forming the planarizing film. Further, by forming a conductive film on the projection on the planarizing film commonly for pixel electrodes and for the common electrode portion, it is unnecessary to independently perform the step of applying a conductive paste for the common electrode portion as in the related art. As a result, the number of manufacturing steps can be further reduced. Further, the projection may be formed of a material different from that of the planarizing film. In this case, although the number of process steps is increased, the degree of freedom of design can be increased to thereby increase a margin in each process step. Particularly in the case that the planarizing film is formed of an inorganic material, CMP can be utilized for planarization. In this case, the liquid crystal projector having such the liquid crystal panel is greatly improved in light resistance.

The projections in all the light shielding regions are formed by a TFT process. Accordingly, the projections can be accurately formed to have a required height and a required shape with a required density by using a semiconductor device fabrication process allowing high-precision microfabrication, so that the gap size of the liquid crystal panel according to the present invention can be adjusted with higher accuracy and uniformity as compared with the related art using the spacers.

In the case that the projection is formed of an organic material, that the second substrate is formed of glass, and that the second substrate is provided with a microlens or the like formed of an organic material having a coefficient of thermal expansion largely different from that of glass, it is possible to suppress a difference in distortion or the like between the first substrate and the second substrate due to heat applied in manufacturing the liquid crystal panel. Accordingly, high-precision adjustment of the gap size can be easily effected.

In the manufacturing method for the liquid crystal panel according to the present invention, the planarizing film having the flat surface is formed on the one surface of the first substrate on the liquid crystal layer side, and the projection is formed on the flat surface of the planarizing film at a position in the light shielding region. Accordingly, the related art step of applying spacers for gap adjustment is no longer required, thereby reducing the number of manufacturing steps for the liquid crystal panel. In the case that the projection is formed prior to the step of forming the pixel electrode, the other projection similar to the projection can be formed as a component of the common electrode portion on the flat surface of the planarizing film at a position outside of the effective pixel portion formed by a large number of the pixels, simultaneously with formation of the planarizing film. In this case, since the pixel electrode is formed on the flat surface of the planarizing film after formation of the other projection, the conductive film for the pixel electrode can be formed on the other projection simultaneously with formation of the pixel electrode. Accordingly, the related art step of applying a conductive paste for the common electrode portion is not required, resulting in a reduction in the number of manufacturing steps. Further, in the case that the projection is formed after the step of forming the pixel electrode, the number of process steps is increased. However, the degree of freedom of design can be increased. Additionally, since it is unnecessary to form the projection and the planarizing film from the same film, the degree of freedom of film selection and a margin in each step can be increased.

Further, since the projections are formed by a TFT process, they can be accurately formed to have a required height and a required shape with a required density by using a semiconductor device fabrication process allowing high-precision microfabrication. Further, since each projection is formed at a position in the light shielding region, there is no possibility of alignment disorder of liquid crystal molecules in each pixel region due to the projection in the subsequent step of forming the liquid crystal layer between the first substrate and the second substrate by bonding these substrates opposed to each other in the condition that the projections abut against the innermost surface of the second substrate. Accordingly, the gap size of the liquid crystal panel can be adjusted with high accuracy and uniformity.

In the case that each projection is formed of an organic material, that the first and second substrates are formed from glass substrates, and that the second substrate is provided, with a microlens or the like formed of an organic material, it is possible to suppress a difference in distortion or the like between the first and second substrates due to heat applied in manufacturing the liquid crystal panel. Accordingly, high-precision adjustment of the gap size can be easily effected.

The liquid crystal display according to the present invention includes the liquid crystal panel exhibiting the above effects, so that the liquid crystal display can exhibit similar effects. Further, in the three-panel type liquid crystal projector according to the present invention, the gap sizes of the three liquid crystal panels are made highly uniform, so that color matching can be easily effected.

Other objects and features of the invention will be more fully understood from the following detailed description and appended claims when taken with the accompanying drawings.

DETAILED DESCRIPTION OF THE PREFERRED EMBODIMENTS

Some preferred embodiments of the present invention will now be described with reference to the drawings.

Figure 1:
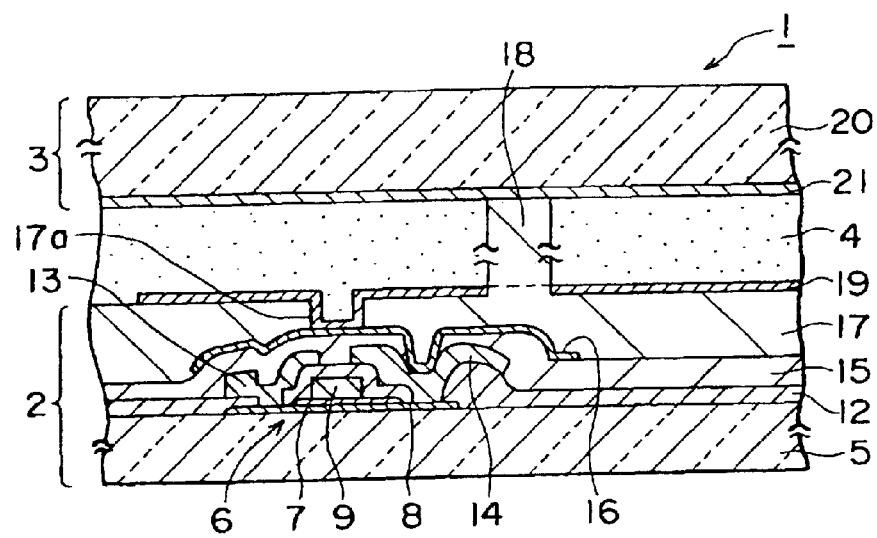
FIG. 1 is a sectional view of an essential part of a liquid crystal panel according to a preferred embodiment of the present invention.
Figure 2:
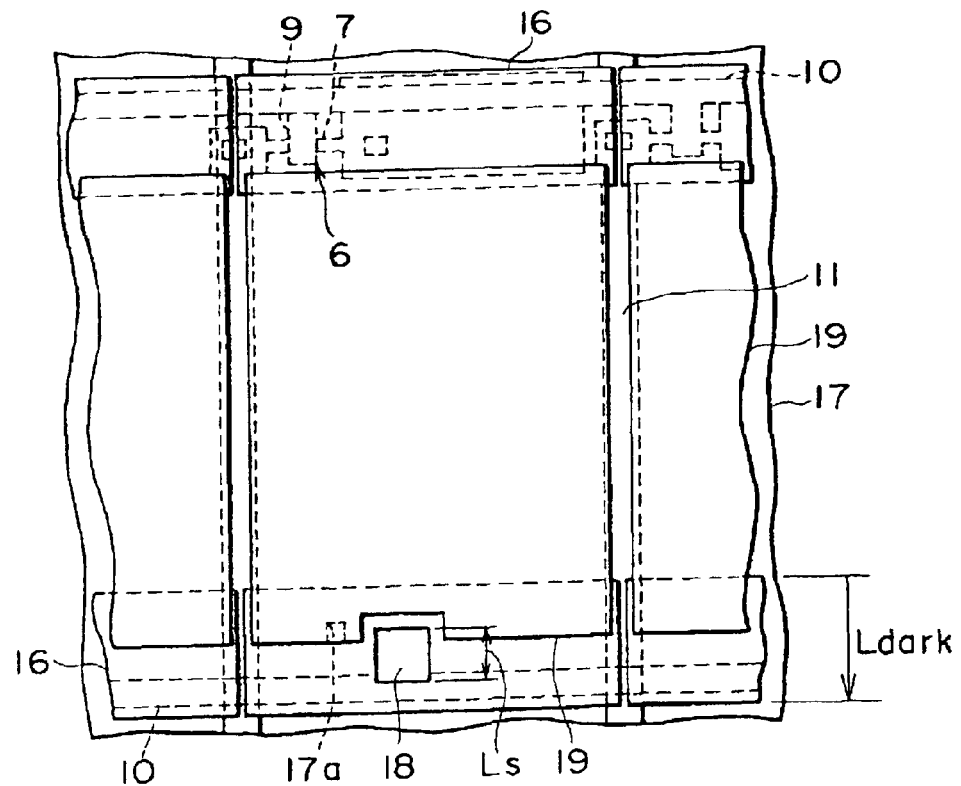
FIG. 2 is a plan view of a first substrate of the liquid crystal panel shown in FIG. 1.

FIG. 1 is a sectional view of an essential part of a liquid crystal panel 1 included in a liquid crystal display according to a preferred embodiment of the present invention. The liquid crystal panel 1 is a liquid crystal panel included in a transmissive liquid crystal display, for example. FIG. 2 is a plan view of a first substrate 2 of the liquid crystal panel 1 shown in FIG. 1.

The transmissive liquid crystal display according to the preferred embodiment includes the liquid crystal panel 1 shown in FIG. 1, a driver (LSI) (not shown) for the liquid crystal panel 1, and a backlight (not shown) provided on the back side of the liquid crystal panel 1 opposite to the front side on which ambient light is incident, for illuminating the liquid crystal panel 1 from the back side thereof.

As shown in FIG. 1, the liquid crystal panel 1 is composed generally of a pair of first and second substrates 2 and 3 opposed to each other with a given spacing (gap) defined therebetween, and a liquid crystal layer 4 formed so as to fill the given gap between the first and second substrates 2 and 3. In the liquid crystal panel 1, numerous pixels are arranged in the form of a matrix to form an effective pixel portion, in which a space between any adjacent ones of the pixels is defined as a light shielding region.

The first substrate 2 includes a transparent dielectric substrate 5 such as a glass substrate. A plurality of substantially parallel gate lines 10 of doped poly-Si (DOPOS), for example, are formed on one surface of the dielectric substrate 5 on the liquid crystal layer 4 side so as to be spaced from each other, and a plurality of signal lines 11 of Al, for example, are also formed on the one surface of the dielectric substrate 5 so as to be spaced from each other and extend in a direction substantially perpendicular to the gate lines 10. Accordingly, a plurality of rectangular regions are defined by the gate lines 10 and the signal lines 11. In each rectangular region surrounded by the adjacent gate lines 10 and the adjacent signal lines 11, a switching element 6 of such as a thin-film transistor (TFT) for driving a liquid crystal is formed near one of the intersections of the adjacent gate lines 10 and the adjacent signal lines 11, and a pixel electrode 19 of ITO, for example, is provided so as to almost cover each rectangular region.

In this manner, the first substrate 2 includes the plural pixel electrodes 19 independently arranged in the form of a matrix in the effective pixel portion, and the positions of the plural pixel electrodes 19 almost respectively correspond to the plural pixels.

Each switching element 6 includes an island-like semiconductor layer 7 formed on the one surface of the dielectric substrate 5 on the liquid crystal layer 4 side, a gate electrode 9 of DOPOS, for example, formed on the semiconductor layer 7 through a gate dielectric film 8 of $SiO_2$, for example, a source electrode 13 of Al, for example, formed on the semiconductor layer 7, and a drain electrode 14 of Al, for example, formed on the semiconductor layer 7. The semiconductor layer 7 constitutes a source and a drain of a transistor, and is formed of a-Si or poly-Si, for example. The gate electrode 9 is connected to the corresponding gate line 10 formed on the one surface of the dielectric substrate 5 on the liquid crystal layer 4 side.

A first interlayer dielectric film 12 of inorganic material such as PSG is formed on the one surface of the dielectric substrate 5 so as to cover the semiconductor layer 7, the gate dielectric film 8, the gate electrode 9, and the gate line 10. The source electrode 13 and the drain electrode 14 are provided on the first interlayer dielectric film 12 so as to be respectively connected through contact holes (not shown) formed in the first interlayer dielectric film 12 to the source and the drain of the semiconductor layer 7. The signal line 11 is also formed on the first interlayer dielectric film 12, and the source electrode 13 is connected to the signal line 11.

Each of the signal line 11, the source electrode 13, the drain electrode 14, the gate electrode 9, and the gate line 10 is formed of a material (e.g., Al) capable of shielding the light incident on the second substrate 3 from the backlight located on one side of the second substrate 3 opposite to the liquid crystal layer 4, i.e., on the back side of the liquid crystal panel 1. Such components including the gate line 10 and the signal line 11 are covered with a black matrix 16 to be hereinafter described in this preferred embodiment. However, in the case that the black matrix 16 is not provided, these components constitute the light shielding region for shielding the light passing between the adjacent pixels (between the adjacent pixel electrodes 19).

A second interlayer dielectric film 15 of inorganic material or organic material is formed on the first interlayer dielectric film 12 so as to cover the signal line 11, the source electrode 13, and the drain electrode 14. A black matrix 16 for blocking the incidence of the light from the backlight on the switching element 6 and for constituting a storage capacitor is provided on the second interlayer dielectric film 15. The black matrix 16 is formed of a light shielding material such as titanium (Ti), tungsten (W), and molybdenum (Mo). The black matrix 16 is formed so as to extend along each gate line 10 and cover the switching element 6 and each gate line 10.

Accordingly, each signal line 11 and each black matrix 16 constitute a light shielding region for shielding the light passing between the adjacent pixels between the adjacent pixel electrodes 19). The black matrix 16 is connected through a contact hole (not shown) formed in the second interlayer dielectric film 15 to the drain electrode 14.

A dielectric planarizing film 17 of inorganic material or organic material is formed on the second interlayer dielectric film 15 so as to cover the black matrix 16. The planarizing film 17 has a flat surface on the liquid crystal layer 4 side. The flat surface of the planarizing film 17 is formed with a cylindrical projection 18 at a suitable position in each light shielding region of the effective pixel portion. Particularly in this preferred embodiment, the projection 18 is formed at a position above the black matrix 16 so as to project from the flat surface of the planarizing film 17. The planarizing film 17 is formed with a contact hole 17a extending to the black matrix 16.

The projection 18 is formed so as to correspond to each pixel region, and functions to abut against the innermost surface of the second substrate 3 on the liquid crystal layer 4 side, thereby defining the given gap between the first substrate 2 and the second substrate 3. The projection 18 has a shape and size such that the given gap can be defined between the first and second substrates 2 and 3 and that a strength capable of maintaining the given gap can be ensured. In other words, the shape of the projection 18 is not especially limited as far as the above conditions are satisfied. For example, a rectangular cylindrical shape having a substantially square or oblong end surface as viewed in plan or a circular cylindrical shape having a substantially circular end surface as viewed in plan may be adopted as the shape of the projection 18.

The size of the projection 18 is such that the height of the projection 18 is set equal to the gap size (e.g., about 1 $\mu$m to 5 $\mu$m) between the first substrate 2 and the second substrate 3, that the dimension both vertically and horizontally (or diameter) of the end surface of the projection 18 can ensure a strength capable of maintaining the gap size, and that the area of the end surface of the projection 18 is set equal to or less than a half of the area of the light shielding region (the black matrix 16) where the projection 18 is located. The reason for setting of the upper limit of the area as mentioned above is to eliminate the influence of domain disclination.

In the case that the semiconductor layer 7 of the switching element 6 is formed of poly-Si under high-temperature conditions and that the black matrix 16 is substantially oblong as viewed in plan and has a short-side length Ldark of about 10 $\mu$m to 20 $\mu$m, the area of the end surface of the projection 18 becomes about ½ of the area of the black matrix 16 by setting the length Ls of each side of the substantially square end surface as viewed in plan of the projection 18 $\mu$m to about 7 $\mu$m or less which is ½ or less of the length Ldark, or by setting the diameter Ls of the substantially circular end surface of the projection 18 to about 9 $\mu$m to 10 $\mu$m or less. In the case of using a photosensitive material (to be hereinafter described) as the material of the projection 18, the minimum value of Ls is defined by a limit resolution of the material, and in other cases, it is defined by the rules of photolithography and etching.

Further, in the case that the semiconductor layer 7 of the switching element 6 is formed of poly-Si under low-temperature conditions or a-Si and that the black matrix 16 is substantially oblong as viewed in plan and has a short-side length Ldark of about 15 $\mu$m to 60 $\mu$m, the area of the end surface of the projection 18 becomes about ½ of the area of the black matrix 16 by setting the length Ls of each side of the substantially square end surface as viewed in plan of the projection 18 to about 25 $\mu$m or less which is about ½ or less of the length Ldark, or by setting the diameter Ls of the substantially circular end surface as viewed in plan of the projection 18 to about 30 $\mu$m or less.

The projection 18 is formed of the same material as that of the planarizing film 17 or a material different from that of the planarizing film 17. In the case that the projection 18 and the planarizing film 17 are formed of the same material, it should be a material allowing the surface of the planarizing film 17 to be easily made flat and also allowing the projection 18 to be easily and integrally formed on the surface of the planarizing film 17 having certain thickness. For example, an organic material may be adopted as this material. An example of the organic material is a photosensitive or nonphotosensitive acrylic resin or a material containing this acrylic resin as a primary component. In this preferred embodiment, a negative photosensitive acrylic resin is used as the organic material to form the planarizing film 17 and the projection 18. In the case that the projection 18 and the planarizing film 17 are formed of different materials, an inorganic material such as $SiO_2$ by SOG or CVD may be used as the material of the planarizing film 17. In this case, the formation of the planarizing film 17 may be followed by planarization by CMP. Thereafter, the projection 18 of an organic material is formed on the planarizing film 17 in a manner similar to that mentioned above.

Further, another projection (not shown) having a configuration similar to that of the projection 18 may be formed on the surface of the planarizing film 17 at a position in a peripheral portion of the liquid crystal panel 1 outside of the effective pixel portion. In this case, the other projection functions as a component of a common electrode portion for allowing the switching element 6 of the first substrate 2 to take a common potential with respect to an opposing electrode of the second substrate 3 (to be hereinafter described).

The pixel electrode 19 for each pixel is formed on the surface of the planarizing film 17 having the projection 18 and the other projection so as to cover the inner surface of the contact hole 17a and not cover the projection 18. Further, a conductive film (not shown) of a material similar to that of the pixel electrode 19 may be formed on the surface of the planarizing film 17 in the peripheral portion of the liquid crystal panel 1 outside of the effective pixel portion so as to cover the upper surface and side surface of the other projection, and the above-mentioned common electrode portion may be composed of the other projection and this conductive film. In this case, the pixel electrode 19 and the conductive film of the common electrode portion are formed from a transparent conductive film of ITO. Further, an alignment film (not shown) is formed on the surface of the planarizing film 17 sodas to cover the pixel electrodes 19 except the common electrode portion.

On the other hand, the second substrate 3 includes a transparent dielectric substrate 20 such as a glass substrate. An opposing electrode 21 is formed on one surface of the dielectric substrate 20 on the liquid crystal layer 4 side. Further, an alignment film (not shown) of polyimide, for example, is formed on the opposing electrode 21. The opposing electrode 21 is formed from a transparent conductive film such as an ITO film.

The first substrate 2 and the second substrate 3 of the liquid crystal panel 1 are opposed to each other with the liquid crystal layer 4 of TN liquid crystal, for example, interposed therebetween in the condition where the projections 18 of the first substrate 2 abut against the alignment film of the second substrate 3 which film forms the innermost surface of the second substrate 3 on the liquid crystal layer 4 side.

There will now be described a preferred embodiment of the manufacturing method for the liquid crystal panel 1 according to the present invention with reference to FIGS. 3A to 3F.

FIGS. 3A to 3F are sectional views showing the steps of the manufacturing method for the liquid crystal panel 1 shown in FIG. 1.

Figure 3A:
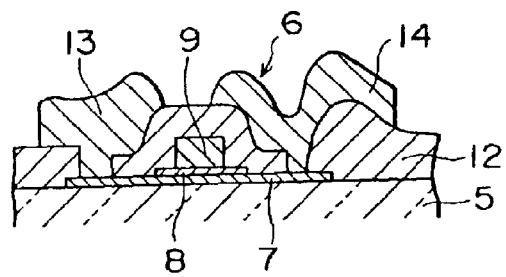
FIGS. 3A to 3F are sectional views showing the steps of manufacturing method for the liquid crystal panel shown in FIG. 1.

As shown in FIG. 3A, the switching element 6 is formed on one surface of the dielectric substrate 5 on the liquid crystal layer 4 side by a known technique. That is, the semiconductor layer 7, the gate dielectric film 8, the gate electrode 9, and the gate line 10 (see FIG. 2) are formed on;the one surface of the dielectric substrate 5. Then, the first interlayer dielectric film 12 is formed on the one surface of the dielectric substrate 5 so as to cover these components. Then, the source electrode 13, the drain electrode 14, and the signal line 11 (see FIG. 2) are formed on the first interlayer dielectric film 12. In this manner, the switching element 6 is provided in each pixel region of the effective pixel portion.

Figure 3B:
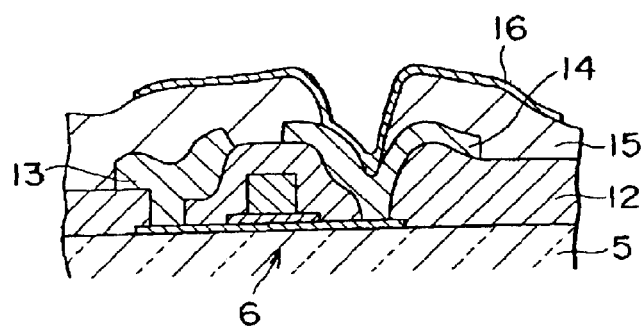

As shown in FIG. 3B, the second interlayer dielectric film 15 is formed on the first interlayer dielectric film 12 so as to cover the source electrode 13, the drain electrode 14, and the signal line 11. Then, the black matrix 16 is formed on the second interlayer dielectric film 15 by sputtering, photolithography, and etching, for example.

Figure 3C:
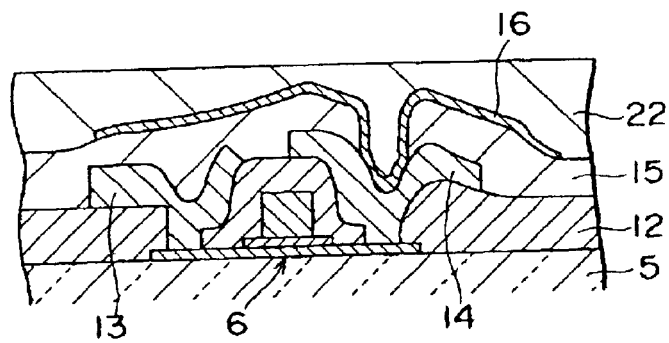
Figure 3D:
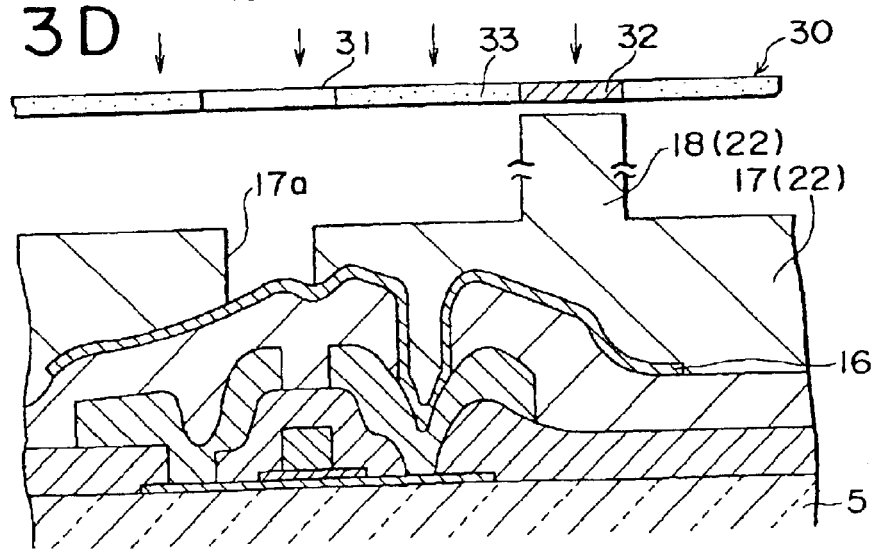

FIGS. 3C and 3D show the steps of forming the planarizing film 17 and the projection 18. In this preferred embodiment, the planarizing film 17 and the projection 18 are formed of a negative photosensitive acrylic resin, for example. As shown in FIG. 3C, a resin film 22 of such a photosensitive acrylic resin having a thickness giving a flat upper surface, e.g., a thickness of about 5 $\mu$m, is formed on the second interlayer dielectric film 15 so as to cover the black matrix 16 by spin coating.

As shown in FIG. 3D, a mask 30 having a light shielding pattern 31 at a position where the contact hole 17a of the planarizing film 17 is to be formed, an opening pattern 32 at a position just above the black matrix 16 where the projection 18 is to be formed, and a half-tone pattern 33 for forming the flat surface of the planarizing film 17 is used to simultaneously form the planarizing film 17 of the resin film 22, the contact hole 17a reaching the black matrix 16, and the projection 18 of the resin film 22 by photolithography with the intensity of UV exposure light changed.

In the photolithography, the multiple exposure of the resin film 22 to UV light, for example, is followed by development and post-baking to obtain the planarizing film 17, the contact hole 17a, and the projection 18. At this time, the height of the projection 18 defining the gap size is set to about 3 $\mu$m to 4 $\mu$m, for example.

Alternatively, a nonphotosensitive acrylic resin may be used as the material of the planarizing film 17 and the projection 18 to form them by etching. In this case, after forming the resin film 22 in the same manner as that mentioned above, a resist pattern is formed on the resin film 22, and dry etching is carried out with the resist pattern used as a mask, thereby allowing formation of the planarizing film 17, the contact hole 17a, and the projection 18. As an etching gas to be used in the dry etching, a mixed gas of tetrafluoromethane ($CF_4$) and oxygen ($O_2$) may be used. Further, the planarizing film 17 may be formed by forming an $SiO_2$ film and next planarizing this film by CMP. In this case, the projection 18 may be formed of a nonphotosensitive acrylic resin or a photosensitive acrylic resin.

Figure 3E:
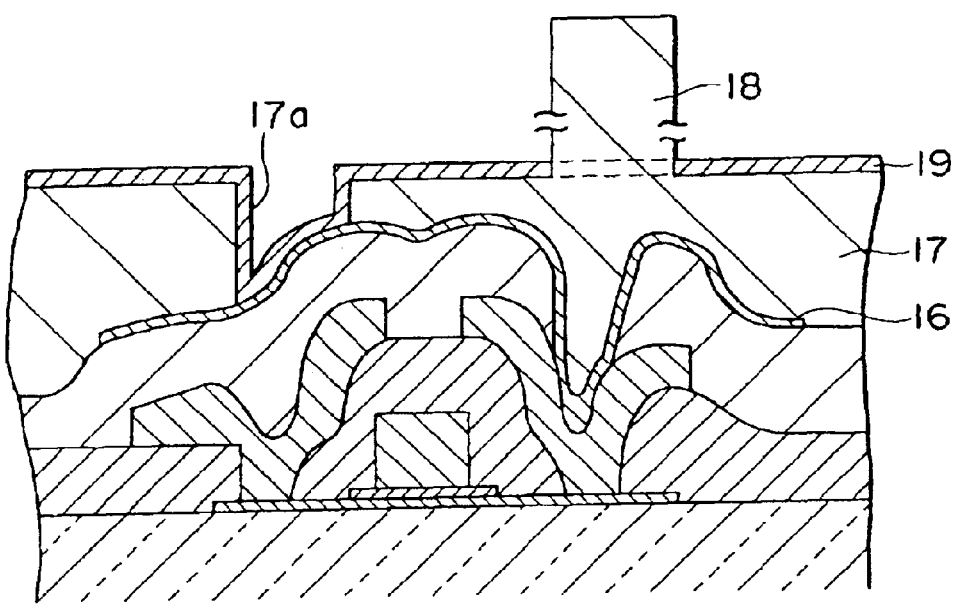

As shown in FIG. 3E, an ITO film is formed on the planarizing film 17 by sputtering, for example, so as to cover the inner surface of the contact hole 17a and the upper surface and side surface of the other projection constituting the common electrode portion and not cover the projection 18. Then, the ITO film is patterned by photolithography and etching to form the pixel electrode 19. Further, the alignment film (not shown) is formed on the surface of the planarizing film 17 so as to cover the pixel electrode 19 except the common electrode portion. Thus, the first substrate 2 with the pixel electrodes 19 arranged in the form of matrix is fabricated. Alternatively, the pixel electrodes 19 may be formed immediately after forming the planarizing film 17. That is, because the material of the projection 18 may be different from the material of the planarizing film 17, the degree of freedom of the fabricating steps can be increased.

Figure 3F:
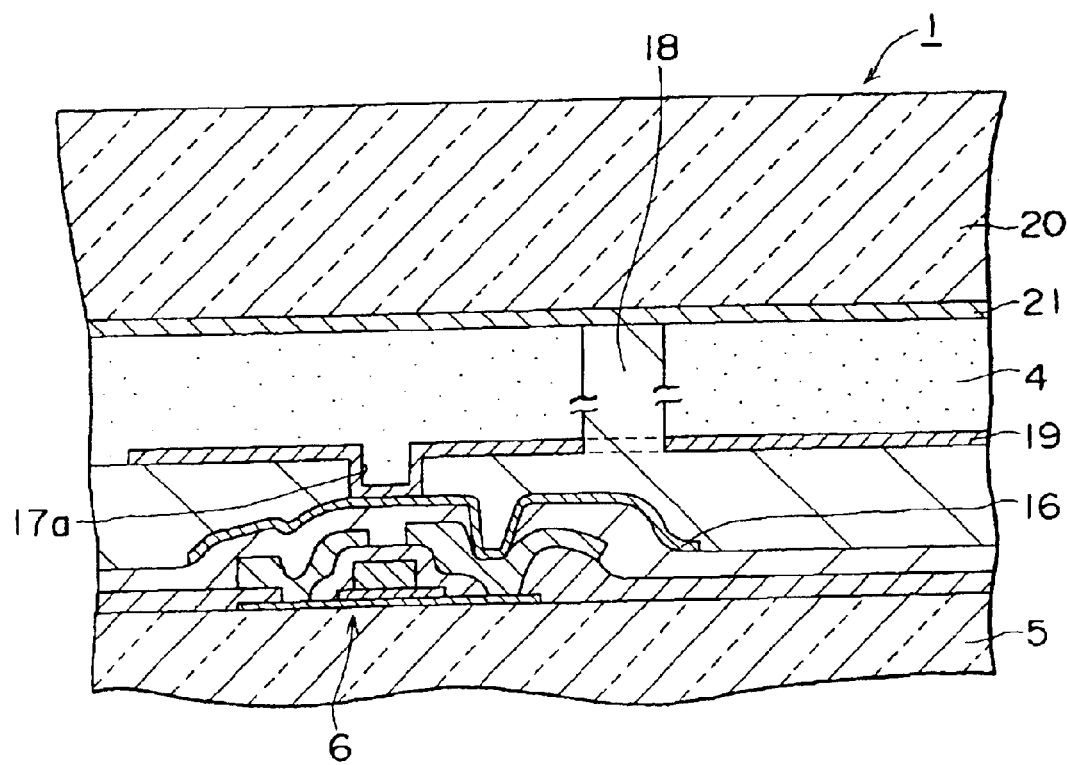

As shown in FIG. 3F, the second substrate 3 including the dielectric substrate 20, the opposing electrode 21 formed on one surface of the dielectric substrate 20 on the liquid crystal layer 4 side, and the alignment film (not shown) formed on the opposing electrode 21 is preliminarily fabricated by a known technique, and the first substrate 2 fabricated as above and this second substrate 3 are opposed to each other with the projections 18 of the first substrate 2 abutting against the alignment film of the second substrate 3 forming the innermost surface of the second substrate 3 on the liquid crystal layer 4 side. In this condition, the first substrate 2 and the second substrate 3 are bonded together at their peripheral portions. Then, a liquid crystal is injected from an injection opening (not shown) formed through the peripheral portions into the gap defined between the first and second substrates 2 and 3 and maintained by the projections 18, thereby forming the liquid crystal layer 4. Finally, the injection opening is sealed to complete the liquid crystal panel 1.

According to the manufacturing method as mentioned above, the planarizing film 17 is formed on the liquid crystal layer 4 side of the first substrate 2, and the projections 18 are formed by a TFT process so as to project from the planarizing film 17. Accordingly, it is unnecessary to carry out the step of applying spacers for gap adjustment as in the related art. Further, the other projection having a similar configuration with the projection 18 constituting the common electrode portion can be formed simultaneously with formation of the planarizing film 17 and the projections 18. In this case, the conductive film covering the other projection can also be formed simultaneously with formation of the pixel electrodes 19 on the surface of the planarizing film 17. Accordingly, it is also unnecessary to carry out the step of applying a conductive paste for the common electrode portion as in the related art. Thus, the number of manufacturing steps can be greatly reduced as compared with that in the related art, so that the liquid crystal panel 1 can be manufactured at a low cost.

Since the manufacturing method in this preferred embodiment employs a TFT process for forming the projections 18, the projections 18 can be accurately formed to have a required height, a required shape and a required density by using a semiconductor device fabrication process allowing high-precision microfabrication. Further, the planarizing film 17 having excellent planarity can also be formed. In addition, by adopting CMP for planarization of the surface of the planarizing film 17 formed of an inorganic material, very-high-precision planarization can be achieved to thereby increase light resistance.

Each projection 18 is formed on the surface of the planarizing film 17 at a position just above the corresponding black matrix 16. Accordingly, in the subsequent steps of bonding the first substrate 2 and the second substrate 3 opposed to each other with the projections 18 abutting against the innermost surface of the second substrate 3 and next forming the liquid crystal layer 4 in the gap between these substrates 2 and 3, there is no possibility of alignment disorder of the liquid crystal molecules in the liquid crystal layer 4 due to the projections 18 in all the pixel regions. Accordingly, the alignment of the liquid crystal molecules in the liquid crystal layer 4 can be improved.

Further, since each projection 18 is formed at a position just above the corresponding black matrix 16, a reduction in display quality due to a reduction in pixel size can be avoided. Accordingly, it is possible to manufacture the liquid crystal panel 1 having a high display quality with the gap size adjusted highly accurately and uniformly, irrespective of the pixel size.

As described above, each projection 18 abutting against the innermost surface of the second substrate 3 on the liquid crystal layer 4 side to define the given gap between the first substrate 2 and the second substrate 3 is formed on the surface of the planarizing film 17 at a position just above the corresponding black matrix 16. Accordingly, there is no possibility of an alignment disorder of the liquid crystal molecules due to the projections 18 in all the pixel regions, and a reduction in display quality due to the projections 18 can be suppressed in spite of a reduction in pixel size.

In the liquid crystal panel 1, the other projection constituting the common electrode portion may be formed of the same material as that of the projections 18. Accordingly, the projections 18 and the other projection can be formed simultaneously with formation of the planarizing film 17 as in the above manufacturing method. In this case, the conductive film constituting the common electrode portion may also be formed of the same material as that of the pixel electrodes 19, so that the conductive film can be formed simultaneously with formation of the pixel electrodes 19. Accordingly, the productivity can be improved over the related art to achieve low-cost manufacturing. In the case that the other projection is not formed, a related art common member may be used, of course. Also in this case, the effect of the present invention can be exhibited.

Further, as in the manufacturing method mentioned above, the projections 18 can be accurately formed to have a required height and a required shape with a required density by using a semiconductor device fabrication process allowing high-precision microfabrication. Accordingly, as compared with the related art technique using spacers in the gap, the gap size can be adjusted with higher accuracy, and the uniformity of the gap size can be improved, so that the liquid crystal panel 1 having a high display quality can be manufactured at a low cost.

Accordingly, the transmissive liquid crystal display using the liquid crystal panel 1 in this preferred embodiment can be improved in display quality and can be reduced in manufacturing cost. Further, the three-panel type liquid crystal projector using the transmissive liquid crystal panels according to this preferred embodiment has advantages such that display nonuniformity due to Newton's rings can be eliminated and color matching can also be easily effected (not shown).

Having thus described a specific preferred embodiment of the liquid crystal panel for use in a transmissive liquid crystal display, it should be noted that the present invention is not limited to the above preferred embodiment. For example, the present invention is also applicable to a reflective liquid crystal display and a liquid crystal display using a ferroelectric liquid crystal. The reflective liquid crystal display is a liquid crystal display not using backlight illumination, but using only ambient light. In the reflective liquid crystal display, each pixel electrode in the above preferred embodiment serves also as a reflecting plate formed of Al, for example, for reflecting incident light from the outer side of the second substrate opposite to the liquid crystal layer for display.

Figure 4:
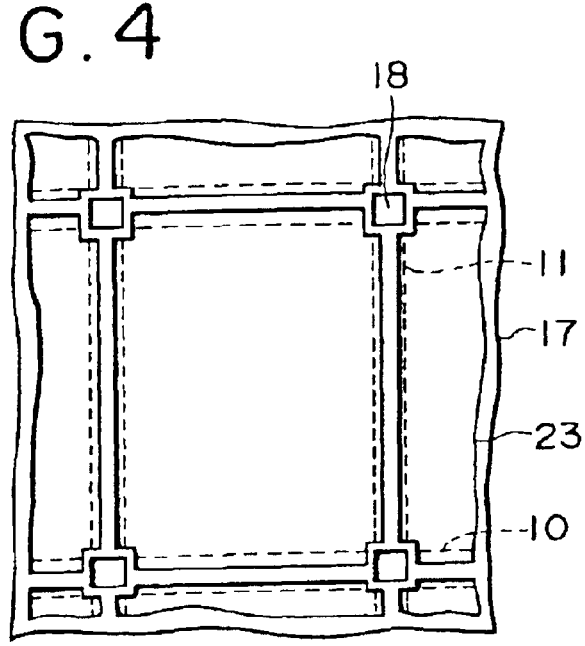
FIG. 4 is a plan view of an essential part of a liquid crystal panel according to another preferred embodiment of the present invention.

Accordingly, the black matrix is not required in the reflective liquid crystal display. In the case of applying the present invention to a reflective liquid crystal display, the liquid crystal panel may be modified as shown in FIG. 4. That is, FIG. 4 is a plan view of an essential part of a liquid crystal panel according to another preferred embodiment of the present invention. In this preferred embodiment, the projections 18 are formed on the surface of the planarizing film 17 at positions in a light shielding region of an effective pixel portion, e.g., at the intersections of the gate lines 10 and the signal lines 11 both formed of a light shielding material such as Al. Further, pixel electrodes 23 serving also as reflecting plates of Al, for example, are formed so as not to interfere with the projections 18.

Figure 5A:
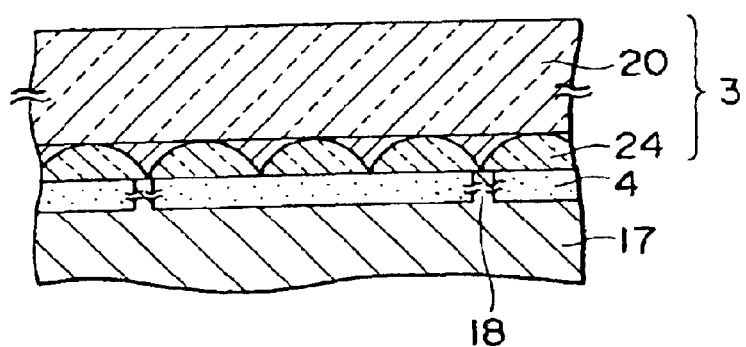
FIG. 5A is a sectional view of an essential part of a liquid crystal panel according to a further preferred embodiment of the present invention, in which microlenses are included in a second substrate of the liquid crystal panel.
Figure 5B:
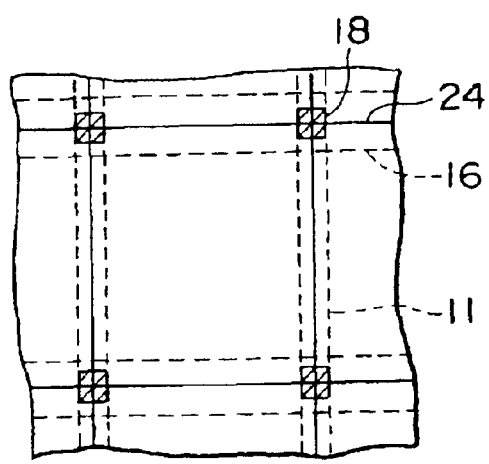
FIG. 5B is a plan view of FIG. 5A.

While the opposing electrode 21 and the alignment film are formed on the liquid crystal layer 4 side of the second substrate 3 in the above preferred embodiment, at least one of color filters and microlenses may be provided on the liquid crystal layer 4 side of the second substrate 3. For example, as shown in FIGS. 5A and 5B, a microlens 24 having a substantially quadrangular shape as viewed in plan is provided on the lower surface of the dielectric substrate 20 of the second substrate 3 on the liquid crystal layer 4 side in each pixel region. In this case, the projections 18 (hatched in FIG. 5B) may be provided at the intersections of the black matrixes 16 and the signal lines 11 as the corner positions of each microlens 24.

Figure 6:
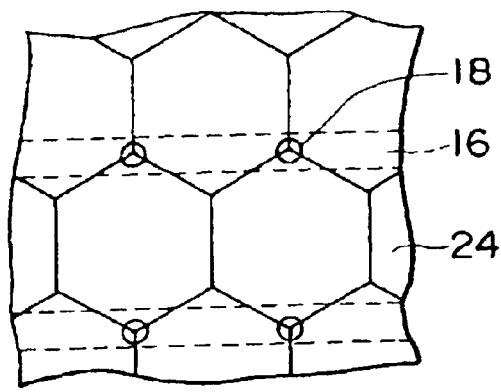
FIG. 6 is a plan view of an essential part of a liquid crystal panel according to a further preferred embodiment of the present invention, in which the second substrate has microlenses different from those shown in FIGS. 5A and 5B.

FIG. 6 shows a modification of the configuration of FIGS. 5A and 5B. As shown in FIG. 6, a microlens 24 having a hexagonal shape as viewed in plan is provided on the lower surface of the dielectric substrate 20 of the second substrate 3 on the liquid crystal layer 4 side in each pixel region. In this case, the projections 18 may be provided at positions corresponding to the apexes of each microlens 24 just above the black matrixes 16.

According to the above configurations wherein the projections 18 are provided at specific positions, the condensing function of each microlens 24 is not hindered by the projections 18, so that the condensing ratio can be improved. Furthermore, the gap size in the liquid crystal panel 1 can be adjusted highly accurately and uniformly by the projections 18.

In the case that the second substrate 3 of the liquid crystal panel 1 has the microlenses 24 or color filters, those are usually formed of a material (e.g., organic material) having a coefficient of thermal expansion different from that of the dielectric substrate 5 of the first substrate 2 and the dielectric substrate 20 of the second substrate 3 in many cases. In this case, however, the projections 18 are formed of organic material or the like, thereby allowing suppression of a difference in distortion between the first substrate 2 and the second substrate 3 due to heat applied in manufacturing the liquid crystal panel 1.

Accordingly, high-precision adjustment of the gap size can be easily effected, so that the present invention is effective particularly to a liquid crystal panel having a second substrate including microlenses or color filters formed of a material different in kind from that of the dielectric substrates of the first and second substrates.

Figure 7:
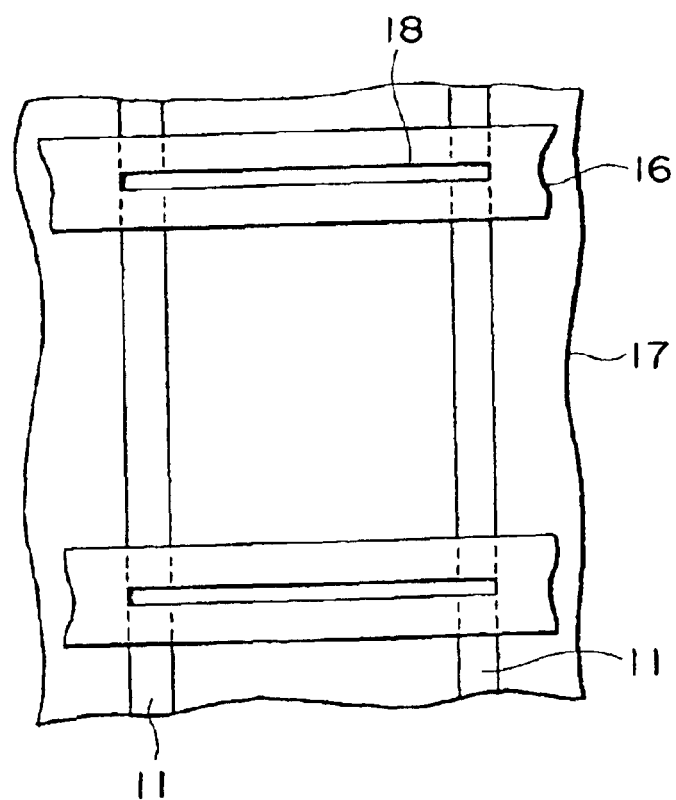
FIG. 7 is a plan view of an essential part of a liquid crystal panel according to a further preferred embodiment of the present invention, in which the liquid crystal panel has a large size.

While each projection 18 in each of the above preferred embodiments has a substantially rectangular or circular cylindrical shape, each projection 18 may be formed as an elongated projection in the case that the liquid crystal panel of the liquid crystal display is a large-sized liquid crystal panel using a ferroelectric liquid crystal. For example, as shown in FIG. 7, an elongated projection 18 is provided on the surface of the planarizing film 17 at a position just above each black matrix 16 so as to extend between the adjacent signal lines 11, for example. In FIG. 7, pixel electrodes are not shown.

According to the configuration of the projections 18 shown in FIG. 7, the gap size between the first substrate 2 and the second substrate 3 can be reliably maintained at a desired size over a long term, so that the present invention is also effective particularly to such a large-sized liquid crystal panel. Further, since high-precision setting of the gap size can be effected by the projections, the present invention is effective particularly to a liquid crystal panel using a ferroelectric liquid crystal in which very precise adjustment of the gap size is required.

In the liquid crystal panel according to the present invention as described above, the projections abutting against the innermost surface of the second substrate on the liquid crystal layer side to define the given gap between the first substrate and the second substrate are formed on the surface of the planarizing film at positions in the light shielding region. Accordingly, the alignment of liquid crystal molecules can be improved to thereby improve the display quality in spite of a reduction in pixel size. Further, since the projections are formed on the surface of the planarizing film, the projections as spacers can be formed by a TPT process. In some case, the other projection constituting the common electrode:portion can be formed simultaneously with formation of the projections, so that the number of manufacturing steps can be greatly reduced to thereby effect low-cost manufacturing.

The projections can be accurately formed by a TFT process to have a required height and a required shape with a required density by using a semiconductor device fabrication process allowing high-precision microfabrication. Accordingly, it is possible to realize a liquid crystal panel in which the gap size is adjusted with high accuracy and improved in uniformity. In the case that the projections are formed of an organic material and that the second substrate has microlenses formed of an organic material largely different in coefficient of thermal expansion from glass, high-precision adjustment of the gap size can also be easily performed.

According to the manufacturing method for the liquid crystal panel of the present invention, the projections are formed on the flat surface of the planarizing film at positions in the light shielding region by using a TFT process simultaneously with formation of the planarizing film on the liquid crystal layer side of the first substrate. Accordingly, the liquid crystal panel can be manufactured with higher productivity at a lower cost as compared with the related art. Further, because the projections are formed by using a TFT process, the projections can be accurately formed to have a required height and a required shape with a required density by using a semiconductor device fabrication process allowing high-precision microfabrication. Further, because the projections are formed at positions in the light shielding region, there is no possibility of alignment disorder of liquid crystal molecules in each pixel region due to the projections. Thus, it is possible to realize the liquid crystal panel of the present invention in which the gap size is adjusted with high accuracy and uniformity. Further, by using the same material for the projections as that for the planarizing film, the liquid crystal panel can be manufactured with a reduced number of steps at a low cost.

Further, even when the second substrate is provided with microlenses formed of an organic material having a coefficient of thermal expansion largely different from that of glass, high-precision adjustment of the gap size can be effected by using an organic material for the projections. Further, by also using an organic material for the planarizing film, the planarizing film and the projections can be formed simultaneously. In the case that the planarizing film is formed of an inorganic material, the surface of the planarizing film can be planarized with a high degree of accuracy by adopting CMP, and the gap control by the projections formed on the flat surface of the planarizing film can be performed more easily. In this case, it is possible to obtain a liquid crystal projector having very high light resistance and low display nonuniformity.

The liquid crystal display of the present invention includes the liquid crystal panel mentioned above. Accordingly, regardless of the kind of the liquid crystal display, e.g., transmissive or reflective type, it is possible to manufacture the liquid crystal panel with high productivity at a low cost in which the gap size in the liquid crystal panel is adjusted with high accuracy and uniformity.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A liquid crystal panel comprising:
   a first substrate having one surface formed with a planarizing film, a plurality of pixels, and a light shielding region present between any adjacent ones of said plurality of pixels;
   a second substrate bonded to said first substrate with a given gap defined therebetween;
   a liquid crystal layer filling said given gap;
   a pixel electrode located on said planarizing film adjacent said liquid crystal layer;
   said second substrate having an opposing electrode formed on said planarizing film opposite said pixel electrode; and
   wherein said planarizing film has a flat surface formed with a projection formed through said pixel electrode film and abutting against an innermost surface of said second substrate adjacent to said liquid crystal layer to define said given gap between said first substrate and said second substrate, said projection being located in said light shielding region; and
   wherein said flat surface of said planarizing film is formed with a common electrode portion for allowing said first substrate to have a common potential with respect to said second substrate.

2. A liquid crystal panel according to claim 1, wherein said projection is formed of the same material as that of said planarizing film.

3. A liquid crystal panel according to claim 1, wherein said projection is formed of a material different from that of said planarizing film.

4. A liquid crystal panel according to claim 1, wherein said electrode is located on a flat surface of said planarizing film not covering said projection in a region corresponding to each pixel.

5. A liquid crystal panel according to claim 1, wherein said projection has an end surface having an area that is about ½ of the area of said light shielding region.

6. A liquid crystal panel according to claim 1, wherein said innermost surface on the liquid crystal side of said second substrate is provided with at least one of a color filter and a microlens.

7. A liquid crystal panel according to claim 1, wherein said projection is formed of an organic material.

8. A liquid crystal panel according to claim 7, wherein said organic material is a photosensitive or nonphotosensitive acrylic resin or a material containing said acrylic resin as a primary component.

9. A liquid crystal panel according to claim 3, wherein said planarizing film is formed of an inorganic material, and said projection is formed of an organic material.

10. A manufacturing method for a liquid crystal panel, comprising the steps of:
   preparing a first substrate and a second substrate;
   forming a plurality of pixels in the form of matrix on one surface of said first substrate;
   forming a light shielding region between any adjacent ones of said plurality of pixels on said one surface of said first substrate;
   forming a planarizing film on said one surface of said first substrate;
   forming a pixel electrode on a surface of said planarizing film;
   forming a projection on a flat surface of said planarizing film through said pixel electrode at a position in said light shielding region;
   bonding said first substrate and said second substrate opposed to each other with a given gap defined therebetween and said projection abutting against an innermost surface of said second substrate; and
   filling said given gap with a liquid crystal layer in a hermetically sealed condition; and
   said step of forming said projection includes the step of forming a second projection similar to said projection on said flat surface of said planarizing film at a position outside of an effective pixel portion formed by the matrix of said pixels; and
   said step of forming said pixel electrode includes the step of forming a conductive film for said pixel electrode and covering said second projection with said conductive film to thereby form a common electrode portion composed of said second projection and said conductive film for allowing said first substrate to have a common potential with respect to said second substrate.

11. A manufacturing method according to claim 10, wherein said projection is formed of the same material as that of said planarizing film.

12. A manufacturing method according to claim 11, wherein said step of forming said planarizing film is the same as said step of forming said projection.

13. A manufacturing method according to claim 10, wherein said projection is formed of a material different from that of said planarizing film.

14. A manufacturing method according to claim 10, comprising the step of forming said pixel electrode on said flat surface of said planarizing film in a region for forming each pixel at a position not covering said projection, after said step of forming said planarizing film and said projection and before said step of bonding said first substrate and said second substrate.

15. A manufacturing method according to claim 10, further comprising the step of forming said pixel electrode on said flat surface of said planarizing film in a region for forming each pixel, after said step of forming said planarizing film and before said step of forming said projection.

16. A manufacturing method according to claim 10, wherein said innermost surface of said second substrate adjacent to said liquid crystal layer is provided with at least one of a color filter and a microlens.

17. A manufacturing method according to claim 10, wherein said step of forming said projection employs an organic material for said projection.

18. A manufacturing method according to claim 17, wherein said organic material is a photosensitive or nonphotosensitive acrylic resin or a material containing said acrylic resin as a primary component.

19. A manufacturing method according to claim 13, wherein said step of forming said planarizing film employs an inorganic material, and said step of forming said projection employs an organic material.

20. A liquid crystal display having a liquid crystal panel according to claim 1.

21. A liquid crystal projector having a liquid crystal panel according to claim 1.

22. The liquid crystal panel according to claim 1, further comprising at least one switch located in the light shielding region, the switch adapted to energize and de-energize at least one of said pixels, wherein the switch is positioned in the light shielding region.

23. A liquid crystal panel comprising:
   a first substrate having one surface formed with a planarizing film, a plurality of pixels, and a light shielding region present between any adjacent ones of said plurality of pixels;
   a second substrate bonded to said first substrate with a given gap defined therebetween;
   a liquid crystal layer filling said given gap;
   a pixel electrode located on said planarizing film adjacent said liquid crystal layer;
   said second substrate having an opposing electrode formed on said planarizing film opposite said pixel electrode; and
   wherein said planarizing film has a flat surface formed with a projection formed through said pixel electrode film and abutting against an innermost surface of said second substrate adjacent to said liquid crystal layer to define said given gap between said first substrate and said second substrate, said projection being located in said light shielding region; and
   wherein said projection has an end surface having an area that is about ½ of the area of said light shielding region.

24. A liquid crystal panel according to claim 23, wherein said projection is formed of the same material as that of said planarizing film.

25. A liquid crystal panel according to claim 23, wherein said projection is formed of a material different from that of said planarizing film.

26. A liquid crystal panel according to claim 23, wherein said electrode is located on a flat surface of said planarizing film not covering said projection in a region corresponding to each pixel.

27. A liquid crystal panel according to claim 23, wherein said innermost surface on the liquid crystal side of said second substrate is provided with at least one of a color filter and a microlens.

28. A liquid crystal panel according to claim 23, wherein said projection is formed of an organic material.

29. A liquid crystal panel according to claim 28, wherein said organic material is a photosensitive or nonphotosensitive acrylic resin or a material containing said acrylic resin as a primary component.

30. A liquid crystal panel according to claim 25, wherein said planarizing film is formed of an inorganic material, and said projection is formed of an organic material.

* * * * *